United States Patent
Clément et al.

(10) Patent No.: US 7,029,502 B2
(45) Date of Patent: Apr. 18, 2006

(54) AZO DYES, A PROCESS FOR THEIR PREPARATION AND THEIR USE IN THE PRODUCTION OF COLORED PLASTICS OR POLYMERIC COLOR PARTICLES, AND IN THE DYEING OR PRINTING OF HYDROPHOBIC FIBER MATERIALS

(75) Inventors: Antoine Clément, Basel (CH); Anton Andreoli, Itingen (CH); Urs Lauk, Zürich (CH); Athanassios Tzikas, Pratteln (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 28 days.

(21) Appl. No.: 10/470,040

(22) PCT Filed: Jan. 18, 2002

(86) PCT No.: PCT/EP02/00510

§ 371 (c)(1),
(2), (4) Date: Jul. 23, 2003

(87) PCT Pub. No.: WO02/059215

PCT Pub. Date: Aug. 1, 2002

(65) Prior Publication Data

US 2004/0031109 A1    Feb. 19, 2004

(30) Foreign Application Priority Data

Jan. 26, 2001    (EP) .................................. 01810081

(51) Int. Cl.
*C09B 29/42* (2006.01)
*D06P 1/16* (2006.01)

(52) U.S. Cl. .................. 8/506; 8/662; 8/922; 534/770; 534/838; 534/885

(58) Field of Classification Search ................ 534/770, 534/838; 8/506, 662, 922
See application file for complete search history.

(56) References Cited

U.S. PATENT DOCUMENTS 3,853,895 A    12/1974  Lamm et al. ............ 260/294.9

(Continued)

FOREIGN PATENT DOCUMENTS

DE    2718619    11/1978

(Continued)

OTHER PUBLICATIONS

English language abstract for DE 2718883 (1978).

Primary Examiner—Margaret Einsmann
(74) Attorney, Agent, or Firm—Kevin T. Mansfield

(57) ABSTRACT

The present invention relates to an azo dye of formula wherein D is the radical of a diazo component of the benzene, naphthalene, diphenyl, thiophene, benzothiazole, benzisothiazole, thiadiazole, indazole, benzotriazole, pyrazole, anthraquinone, naphthalic acid imide, chromone, phthalimide or diphenylene oxide series, $R_1$ is an unsubstituted or substituted aryl radical and $R_2$ is an unsubstituted or substituted aryl radical, with the exception of the compounds of formulae (1a) and (1b)

to a process for its preparation and to its use in a process for the production of mass-colored plastics or polymeric color particles, and in the dyeing or printing of semi-synthetic or synthetic hydrophobic fiber materials.

8 Claims, No Drawings

U.S. PATENT DOCUMENTS

| | | | |
|---|---|---|---|
| 3,959,250 A | 5/1976 | Heinrich et al. | 260/156 |
| 4,146,535 A * | 3/1979 | Dehnert et al. | 534/756 |
| 4,150,943 A * | 4/1979 | Dehnert et al. | 8/611 |
| 4,515,716 A * | 5/1985 | Niwa et al. | 534/635 |
| 4,774,324 A | 9/1988 | Loeffler et al. | 534/766 |
| 5,623,060 A | 4/1997 | Lamm et al. | 534/573 |
| 5,630,851 A | 5/1997 | Jordine et al. | 8/641 |

FOREIGN PATENT DOCUMENTS

| | | |
|---|---|---|
| DE | 2718883 | 11/1978 |
| DE | 4329915 | 3/1995 |
| EP | 0135131 | 3/1985 |
| EP | 0658605 | 6/1995 |
| FR | 2329724 | 5/1977 |
| GB | 1598893 | 9/1981 |

\* cited by examiner

AZO DYES, A PROCESS FOR THEIR PREPARATION AND THEIR USE IN THE PRODUCTION OF COLORED PLASTICS OR POLYMERIC COLOR PARTICLES, AND IN THE DYEING OR PRINTING OF HYDROPHOBIC FIBER MATERIALS

The present invention relates to novel azo dyes, to a process for their preparation and to their use in a process for the production of mass-coloured plastics or polymeric colour particles, and in the dyeing or printing of semi-synthetic or synthetic hydrophobic fibre materials.

Dyes, especially the dyes of the anthraquinone series, are known for the mass-colouration of plastics. It has been shown, however, that the dyes used hitherto do not always fully satisfy the highest demands, whether it be in respect of high-temperature light fastness or, especially, in respect of colour strength.

There is therefore a need for new thermostable dyes that yield lightfast dyeings, especially high-temperature lightfast dyeings, having high colour strength and that exhibit good allround properties.

It has now been found, surprisingly, that the azo dyes according to the invention meet the criteria given above to a considerable degree.

The present invention accordingly relates to an azo dye of formula

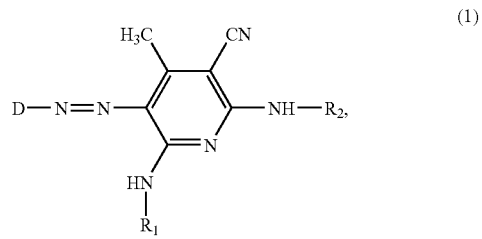

wherein

D is the radical of a diazo component of the benzene, naphthalene, diphenyl, thiophene, benzothiazole, benzisothiazole, thiadiazole, indazole, benzotriazole, pyrazole, anthraquinone, naphthalic acid imide, chromone, phthalimide or diphenylene oxide series, $R_1$ is an unsubstituted or substituted aryl radical and $R_2$ is an unsubstituted or substituted aryl radical, with the exception of the compounds of formulae (1a) and (1b)

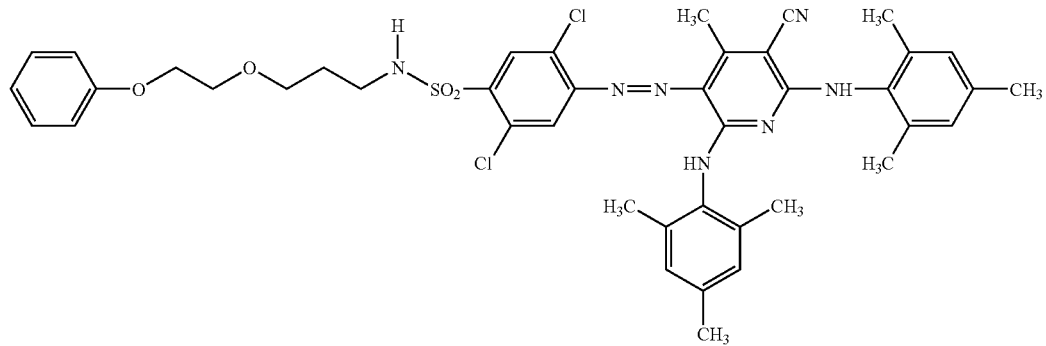

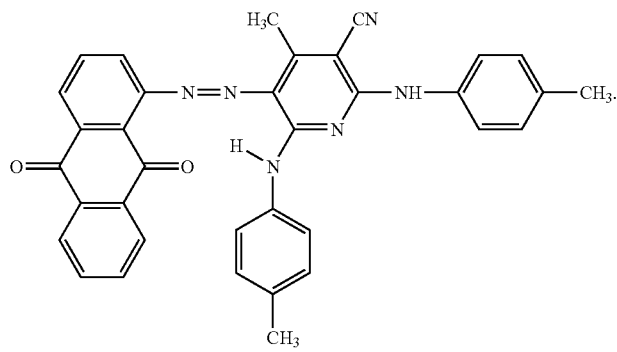

The substituents $R_1$ and $R_2$ may be different from one another or, preferably, have the same meaning.

Of the radicals D, the radicals of a diazo component of the benzene, naphthalene and thiophene series are preferred.

Especially preferred as D is the radical of a diazo component of the benzene series.

The aryl radicals denoted by $R_1$ and $R_2$ may be substituted e.g. by $C_1$–$C_4$alkyl, $C_1$–$C_4$alkoxy, halogen or by the radical —NH—CO—R wherein R is amino, $C_1$–$C_4$alkyl, or phenyl unsubstituted or substituted by $C_1$–$C_4$alkyl, $C_1$–$C_4$alkoxy or halogen.

Preferably, the aryl radicals denoted by $R_1$ and $R_2$ are substituted by methyl, methoxy or chlorine.

The aryl radicals denoted by $R_1$ and $R_2$ are especially substituted by methyl in the ortho-, para- and, more especially, meta-positions to the amino group.

R as $C_1$–$C_4$alkyl is methyl, ethyl, propyl, isopropyl, n-butyl, isobutyl, sec-butyl or tert-butyl.

R as $C_1$–$C_4$alkoxy is e.g. methoxy, ethoxy, propoxy or butoxy. R as halogen is bromine, fluorine and especially chlorine.

$C_1$–$C_4$Alkyl as substituent of $R_1$ and/or $R_2$ and/or phenyl in R is methyl, ethyl, propyl, isopropyl, n-butyl, isobutyl, sec-butyl or tert-butyl.

$C_1$–$C_4$Alkoxy as substituent of $R_1$ and/or $R_2$ and/or in phenyl in R is e.g. methoxy, ethoxy, propoxy or butoxy.

Halogen as substituent of $R_1$ and/or $R_2$ and/or in phenyl in R is bromine, fluorine and especially chlorine.

The azo dyes of the following formulae are important:

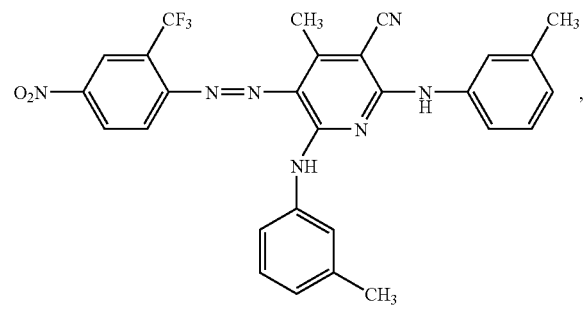

(2)

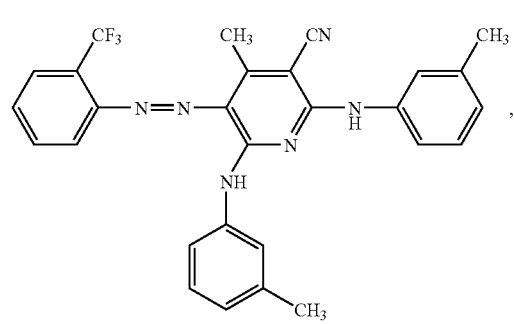

(3)

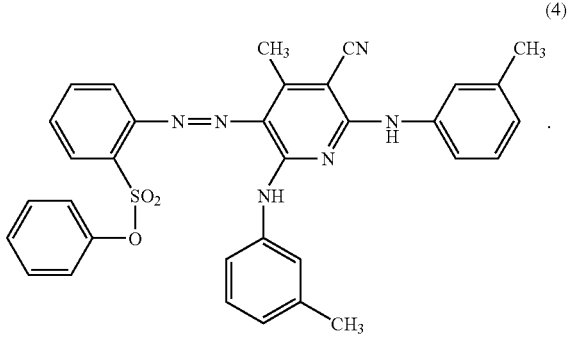

(4)

The present invention relates also to the process for the preparation of the azo dyes of formula (1) according to the invention.

The dyes are prepared, for example, as follows: a compound of formula $$D-NH_2 \quad (50)$$

is diazotised in accordance with a customary procedure and then coupled to a coupling component of formula

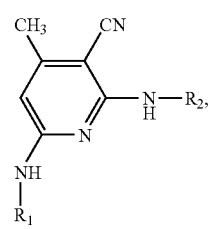

(51)

D, $R_1$ and $R_2$ being as defined above for formula (1).

The diazotisation of the compound of formula (50) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. using nitrosylsulfuric acid. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (50) to the coupling component of formula (51) is likewise effected in known manner, for example in an acidic, aqueous or aqueous-organic, medium, advantageously at temperatures of from −10 to 30° C., especially below 10° C. Examples of acids used are hydrochloric acid, acetic acid, propionic acid, sulfuric acid and phosphoric acid.

The compounds of formula (50) are known or can be prepared in a manner known per se.

The coupling components of formula (51) are known or can be prepared in a manner known per se, for example by reacting a compound of formula

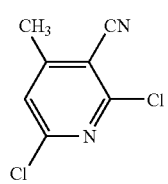

with a compound of formula

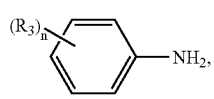

wherein $R_3$ is hydrogen, $C_1$–$C_4$alkyl, $C_1$–$C_4$alkoxy or halogen, n is a number 0, 1, 2 or 3 and $(R_3)_n$ denotes n identical or different substituents $R_3$.

The compounds of formulae (52) and (53) are known and can be prepared in a manner known per se.

The present invention relates also to a process for the preparation of mass-coloured plastics or polymeric colour particles, which comprises mixing together a high molecular weight organic material and a tinctorially effective amount of at least one azo dye of formula (1).

The colouring of high molecular weight organic substances with the azo dye of formula (1) is carried out, for example, by mixing such a dye into those substrates using roll mills, mixing apparatus or grinding apparatus, with the result that the dye is dissolved or finely dispersed in the high molecular weight material. The high molecular weight organic material with the admixed dye is then processed using processes known per se, for example calendering, compression moulding, extrusion, coating, spinning, casting or injection moulding, whereby the coloured material acquires its final form. It is also possible for the admixing of the dye to be carried out immediately prior to the actual processing step, by continuously feeding a solid dye (for example in powder form) and, at the same time, a granulated or pulverulent high molecular weight organic material, and optionally also additional ingredients, e.g. additives, directly into the intake zone of an extruder, where mixing takes place just before processing. In general, however, it is preferable for the dye to be mixed into the high molecular weight organic material beforehand, because more even colouration of the substrates can be obtained.

It is often desirable, in order to produce non-rigid mouldings or to reduce their brittleness, to incorporate so-called plasticisers into the high molecular weight compounds prior to shaping. There may be used as plasticisers, for example, esters of phosphoric acid, phthalic acid or sebacic acid. In the process according to the invention the plasticisers may be incorporated into the polymers before or after the incorporation of the colorant. It is also possible, in order to achieve different shades of colour, to add to the high molecular weight organic materials, in addition to the azo dye of formula (1), also further pigments or other colorants in any desired amounts, optionally together with further additives, e.g. fillers or siccatives.

Preference is given to the colouring of thermoplastic plastics, especially in the form of fibres. Preferred high molecular weight organic materials to be coloured according to the invention are very generally polymers having a dielectric constant of >2.5, especially polyester, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Polyester and polyamide are especially preferred. Very special preference is given to linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); also polycarbonates, e.g. those from α,α-dimethyl4,4-dihydroxy-diphenylmethane and phosgene, or polymers based on polyvinyl chloride and on polyamide, e.g. polyamide-6 or polyamide-6.6.

The present invention relates also to a process for the trichromatic colouration of plastics or particles, wherein at least one red-dyeing azo dye of formula (1), at least one blue-dyeing dye of formulae

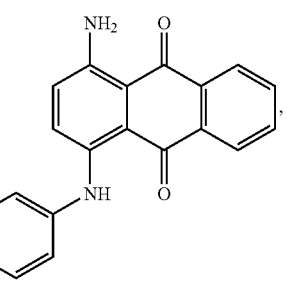

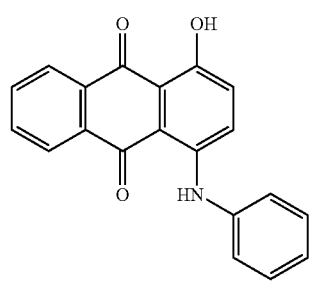

and

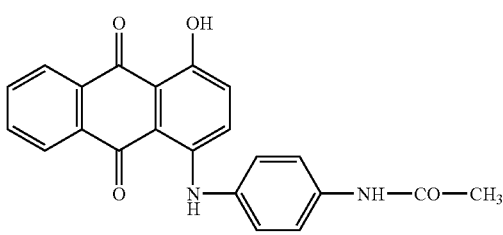

and at least one yellow-dyeing dye of formulae

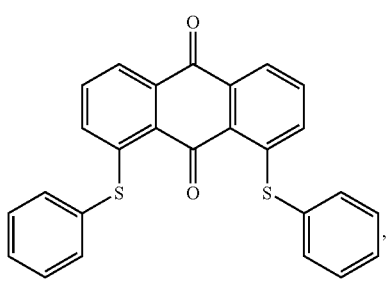

-continued

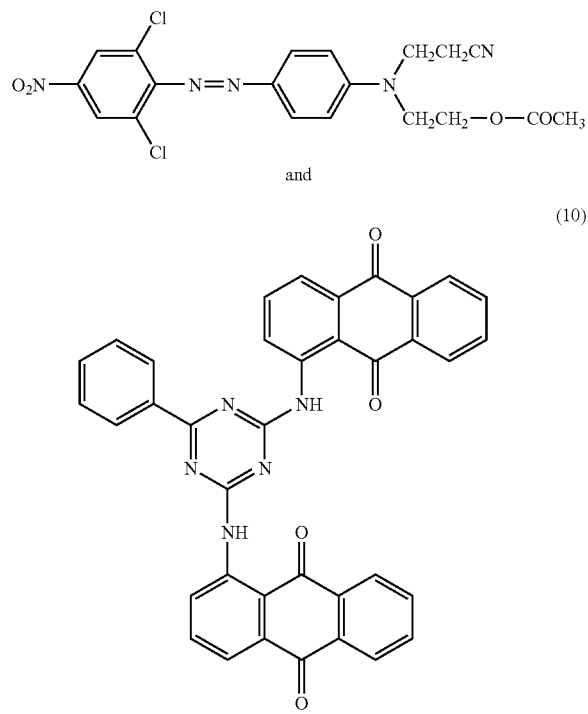

(9)

and (10)

are mixed into the plastics or polymeric colour particles.

The dyes of formulae (5) to (10) are known or can be prepared analogously to known compounds in accordance with procedures known per se.

The definitions and preferences given above apply to the red-dyeing azo dye of formula (1).

Trichromatic dyeing is the additive colour mixing of suitably selected yellow- or orange-dyeing, red-dyeing and blue-dyeing dyes with which any desired shade of the visible colour spectrum can be achieved by an appropriate choice of the relative proportions of the dye components.

In a preferred embodiment of the trichromatic process according to the invention, the red-dyeing azo dye of formula (1) is used together with the blue-dyeing dye of formula (5) or the blue-dyeing dye of formula (7) and the yellow-dyeing dye of formula (8).

The azo dyes according to the invention impart to the above-mentioned materials, especially to polyester materials, tinctorially strong, level colour shades having good in-use fastness properties, especially very good high-temperature light fastness.

The azo dyes according to the invention can also be used in the dyeing and printing of semi-synthetic and, especially, synthetic hydrophobic fibre materials, more especially textile materials. Textile materials composed of blends that contain such semi-synthetic and/or synthetic hydrophobic textile materials can likewise be dyed or printed using the azo dyes according to the invention.

Semi-synthetic textile materials that come into consideration are especially cellulose secondary acetate and cellulose triacetate.

Synthetic hydrophobic textile materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those from α,α-dimethyl-4,4-dihydroxy-diphenylmethane and phosgene, and of fibres based on polyvinyl chloride and on polyamide.

The application of the azo dyes according to the invention to the textile materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose secondary acetate is dyed preferably at about from 65 to 85° C. and cellulose triacetate at temperatures of up to 115° C.

The azo dyes according to the invention will not colour wool and cotton present at the same time in the dyebath or will colour such materials only slightly (very good reservation), so that they can also be used satisfactorily in the dyeing of polyester/wool and polyester/cellulosic fibre blend fabrics.

The azo dyes according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile materials can be in a variety of processing forms, e.g. in the form of fibres, yarns or non-wovens, in the form of woven fabrics or knitted fabrics.

It is advantageous to convert the azo dyes according to the invention into a dye preparation prior to use. For this purpose, the azo dyes are ground so that their particle size is on average from 0.1 to 10 microns. The grinding can be carried out in the presence of dispersants. For example, the dried azo dye is ground with a dispersant or is kneaded into paste form with a dispersant and then dried in vacuo or by atomisation. The preparations so obtained can be used, after the addition of water, to prepare printing pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols. The azo dyes according to the invention impart to the mentioned materials, especially to polyester materials, level colour shades having very good in-use fastness properties, such as, especially, good fastness to light, more especially very good high-temperature light fastness, fastness to thermofixing, to pleating, to chlorine and to wetting, such as fastness to water, perspiration and washing; the finished dyeings are also distinguished by good fastness to rubbing.

The azo dyes according to the invention can also be used satisfactorily in the preparation of mixed shades togeth r with other dyes.

The present invention relates also to the above-mentioned process for dyeing or printing semi-synthetic or synthetic hydrophobic fibre materials.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

EXAMPLE 1

A. 136.70 g of p-toluidine, melted at 50° C., 55.70 g of sodium carbonate and 47.70 g of 2,6-dichloro-3-cyano-methylpyridine are introduced into a laboratory reaction apparatus and stirred at from 50 to 55° C. for 2 hours, then heated to 150° C. and maintained at that temperature for 40 hours. The reaction mass is then heated to 170° C., stirred at that temperature for about 8 hours and then cooled to 80° C.

When the reaction mass has finished reacting, 250.00 ml of ethanol and 250.00 ml of water are added and the mixture is stirred for 5 minutes and then left to stand. Two phases are formed; the upper water/p-toluidine/ethanol phase is separated off and discarded. 500 ml of 1 N HCl are added to the lower phase and the mixture is stirred for 2 hours; the resulting crystalline reaction product is filtered off and washed until neutral with 500.00 ml of 1 N HCl and 1000.00 ml of deionised water and dried in vacuo for 48 hours at 60° C.

74.00 g of the intermediate of formula

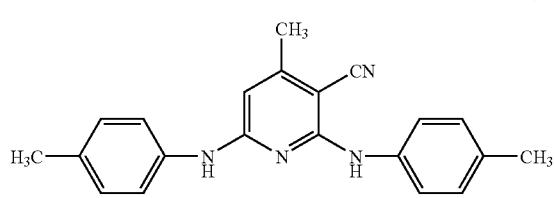
(100)

are obtained.

B. 10.00 ml of glacial acetic acid are introduced into a laboratory reaction apparatus and, with stirring, 2.10 g of 2-amino-5-nitro-benzotrifluoride are added and the mixture is stirred for 5 minutes. 0.60 ml of 96% sulfuric acid is added dropwise to the resulting solution at a temperature of 30° C.; the mixture is stirred for 10 minutes and then in the course of 6 minutes 1.85 ml of 40% nitrosylsulfuric acid are added dropwise. The solution is then stirred at from 20 to 23° C. for 1 hour.

C. 120.00 ml of glacial acetic acid are introduced into a laboratory reaction apparatus and, with stirring, 3.60 g of the intermediate of formula (100) prepared under A. are introduced. The resulting suspension Is heated to a temperature of from 35 to 40° C.; 2.00 ml of 32% hydrochloric acid and 20.00 ml of water are then added and the solution is cooled to 5° C.

The diazo solution prepared under B. is then added dropwise to the resulting solution in the course of 20 minutes at a temperature of from 0 to 5° C. and stirring is carried out at from 0 to 5° C. for one hour. The solution is then heated to room temperature and stirred for 1 hour. The resulting suspension is then filtered with suction, washed with water to pH>5 and then with ethanol and acetone and dried.

4.70 g of an azo dye of formula

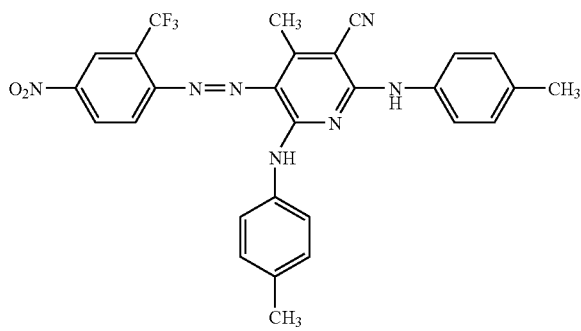
(101)

are obtained, which dyes polyester in red shades.

EXAMPLE 2

1200.00 g of polyester granules (PET Arnite D04-300, DSM) are predried at 130° C. for 4 hours and then mixed homogeneously with 0.24 g of the red azo dye of formula

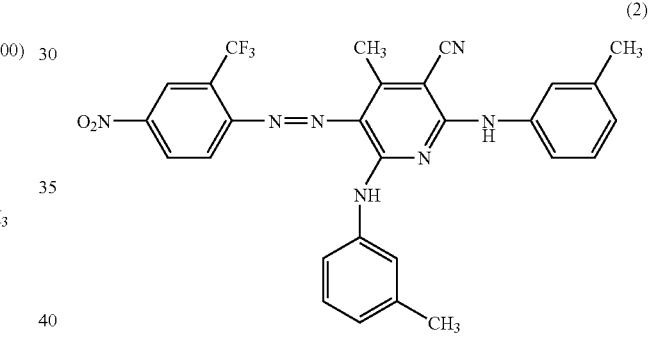
(2)

in a "roller rack" mixing apparatus for 15 minutes at 60 revolutions per minute.

The homogeneous mixture is extruded in an extruder (twin screw 25 mm from Collin, D-85560 Ebersberg) with 6 heating zones at a maximum temperature of 275° C., cooled with water, granulated in a granulator (SGS 50 ET from Scheer, Stuttgart) and then dried at 130° C. for 4 hours.

The resulting neutral-red-coloured polyester granules have good allround properties, especially very good light fastness and high-temperature light fastness properties.

EXAMPLE 3

1200.00 g of polyester granules (PET Arnite D04-300, DSM) are predried at 75° C. for 4 hours and then mixed homogeneously with 0.036 g of a dye mixture containing
30% by weight of the azo dye of formula (2) and
70% by weight of the dye of formula (5)

in a "roller rack" mixing apparatus for 15 minutes at 60 revolutions per minute.

The homogeneous mixture is extruded in an extruder (twin screw 25 mm from Collin, D-85560 Ebersberg) with 6 heating zones at a maximum temperature of 220° C., cooled with water, granulated in a granulator (SGS 50 ET from Scheer, Stuttgart) and then dried at 75° C. for 4 hours.

The resulting violet-coloured polyester granules have good allround properties, especially very good light fastness and high-temperature light fastness properties.

EXAMPLE 4

1200.00 g of polyester granules (PET Arnite D04-300, DSM) are predried at 75° C. for 4 hours and then mixed homogeneously with 0.006 g of the azo dye of formula (2),
0.012 g of the dye of formula (7) and
0.012 g of the dye of formula (8)

in a "roller rack" mixing apparatus for 15 minutes at 60 revolutions per minute.

The homogeneous mixture is extruded in an extruder (twin screw 25 mm from Collin, D-85560 Ebersberg) with 6 heating zones at a maximum temperature of 220° C., cooled with water, granulated in a granulator (SGS 50 ET from Scheer, Stuttgart) and then dried at 75° C. for 4 hours.

The resulting greyish polyester granules have good allround properties, especially very good light fastness and high-temperature light fastness properties.

EXAMPLE 5

Analogously to Example 1 it is also possible to prepare the azo dyes listed in Tables 1 to 10 which likewise dye polyester in red shades:

TABLE 1

Structure: 4-O$_2$N, 2-CF$_3$-phenyl–N=N– coupled to a pyridine ring bearing CH$_3$, CN, –NH–R$_2$, N (ring), and –NH–R$_1$ substituents.

| R$_1$ | R$_2$ |
|---|---|
| 3,5-dimethylphenyl | 3,5-dimethylphenyl |
| 2,4,5-trimethylphenyl | 2,4,5-trimethylphenyl |
| 4-methoxyphenyl | 4-methoxyphenyl |
| 2-methylphenyl | 2-methylphenyl |

TABLE 1-continued

| R$_1$ | R$_2$ |
|---|---|
| 2,4,6-trimethylphenyl | 2,4,6-trimethylphenyl |
| 2-methoxyphenyl | 2-methoxyphenyl |
| 2,4-dimethylphenyl | 2,4-dimethylphenyl |
| 3,5-dimethylphenyl | 3,5-dimethylphenyl |

TABLE 2

Structure: 4-O$_2$N, 2-CN-phenyl–N=N– coupled to a pyridine ring bearing CH$_3$, CN, –NH–R$_2$, N (ring), and –NH–R$_1$ substituents.

| R$_1$ | R$_2$ |
|---|---|
| 3-methylphenyl | 3-methylphenyl |
| 3,5-dimethylphenyl | 3,5-dimethylphenyl |

TABLE 2-continued

[Structure: pyridine core with substituents CN, CH₃, CN, NH-R₂, NH-R₁, and azo linkage to 4-nitro-2-cyanophenyl group (O₂N, CN)]

| R₁ | R₂ |
|---|---|
| 4-methoxyphenyl | 4-methoxyphenyl |
| 2-methylphenyl | 2-methylphenyl |
| 2,4,6-trimethylphenyl | 2,4,6-trimethylphenyl |
| 2-methoxyphenyl | 2-methoxyphenyl |
| 2,4-dimethylphenyl | 2,5-dimethyl-3-pyridyl |
| 3,5-dimethylphenyl | 3,5-dimethylphenyl |
| 4-methylphenyl | 4-methylphenyl |

TABLE 3

[Structure: pyridine core with substituents CH₃, CN, NH-R₂, NH-R₁, and azo linkage to 2-(trifluoromethyl)phenyl group (CF₃)]

| R₁ | R₂ |
|---|---|
| 3-methylphenyl | 3-methylphenyl |
| 2,4-dimethylphenyl | 2,4-dimethylphenyl |
| 4-methoxyphenyl | 4-methoxyphenyl |
| 2-methylphenyl | 2-methylphenyl |
| 2,4,6-trimethylphenyl | 2,4,6-trimethylphenyl |
| 4-methylphenyl | 4-methylphenyl |
| 2,4-dimethylphenyl | 2,4-dimethylphenyl |
| 3,5-dimethylphenyl | 3,5-dimethylphenyl |

TABLE 4

[Structure: pyridine with COOC2H5-phenyl-N=N- substituent, CH3, CN, NH-R2, NH-R1 groups]

| R1 | R2 |
|---|---|
| 3,5-dimethylphenyl | 3,5-dimethylphenyl |
| 4-methylphenyl | 4-methylphenyl |
| 2,3-dimethylphenyl | 2,3-dimethylphenyl |
| 2,5-dimethylphenyl | 2,5-dimethylphenyl |

TABLE 5

[Structure: pyridine with 4-Cl-2-CF3-phenyl-N=N- substituent, CH3, CN, NH-R2, NH-R1 groups]

| R1 | R2 |
|---|---|
| 3,5-dimethylphenyl | 3,5-dimethylphenyl |
| 2,4,5-trimethylphenyl | 2,4,5-trimethylphenyl |
| 4-methylphenyl | 4-methylphenyl |

TABLE 5-continued

[Structure: same as Table 5]

| R1 | R2 |
|---|---|
| 2,3-dimethylphenyl | 2,3-dimethylphenyl |
| 2,3,5,6-tetramethylphenyl | 2,3,5,6-tetramethylphenyl |
| 2,4-dimethylphenyl | 2,4-dimethylphenyl |
| 3,5-dimethylphenyl | 3,5-dimethylphenyl |

TABLE 6

[Structure: pyridine with 2-CN-3-Cl-5-NO2-phenyl-N=N- substituent, CH3, CN, NH-R2, NH-R1 groups]

| R1 | R2 |
|---|---|
| 3,5-dimethylphenyl | 3,5-dimethylphenyl |
| 3,5-dimethylphenyl | 3,5-dimethylphenyl |

TABLE 6-continued
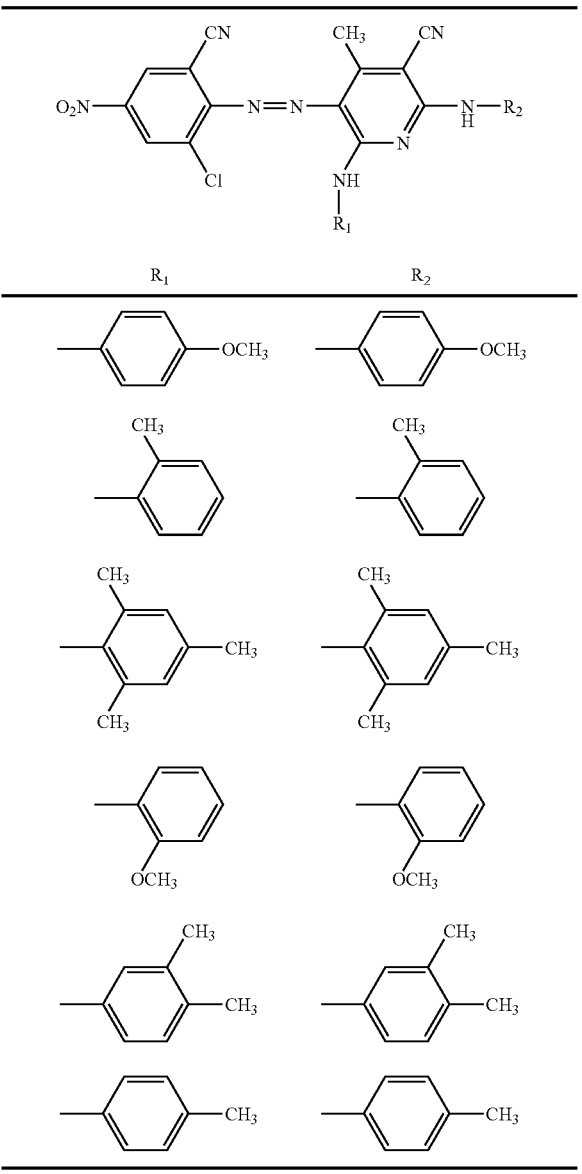
TABLE 7
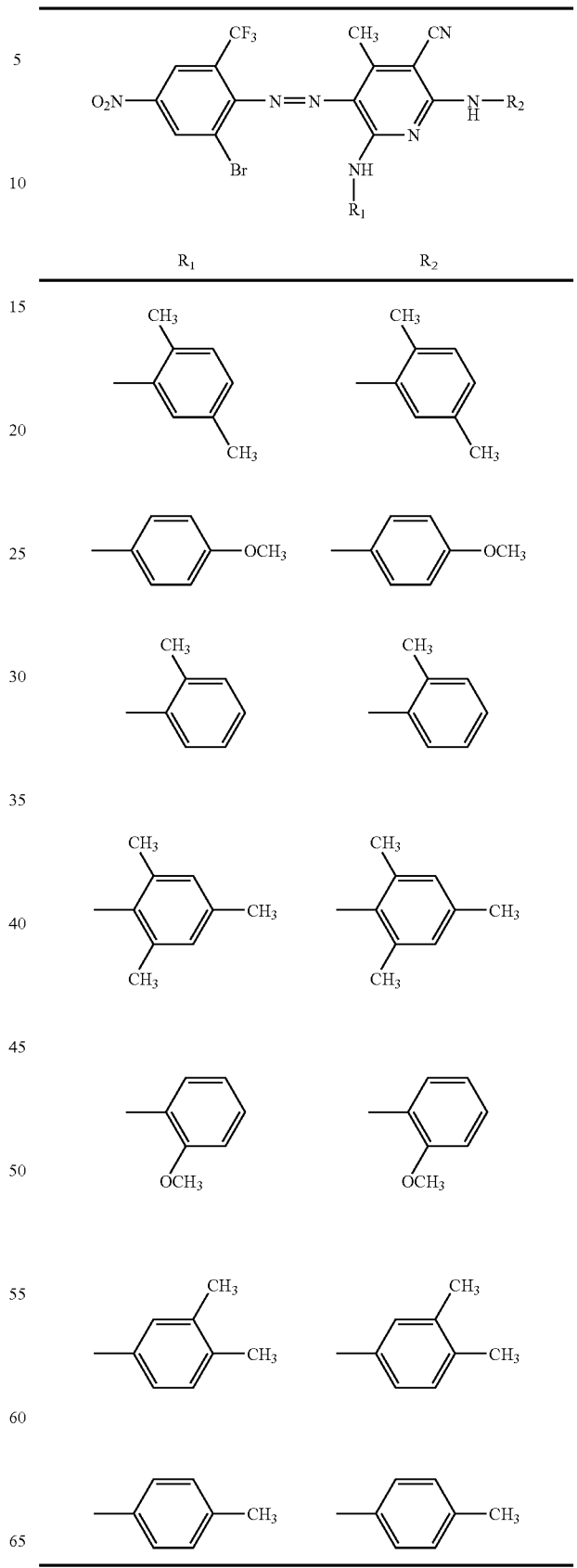

TABLE 8

(Structure: phenyl-SO2-O-phenyl-N=N-pyridine core with CH3, CN, NH-R2, NH-R1 substituents)

| R₁ | R₂ |
|---|---|
| 3-methylphenyl (m-tolyl) | 3-methylphenyl (m-tolyl) |
| 3,4-dimethylphenyl | 3,4-dimethylphenyl |
| 4-methylphenyl (p-tolyl) | 4-methylphenyl (p-tolyl) |
| 2-methylphenyl (o-tolyl) | 2-methylphenyl (o-tolyl) |
| 3,4,5-trimethylphenyl | 3,4,5-trimethylphenyl |
| 2,4-dimethylphenyl | 2,4-dimethylphenyl |
| 3,5-dimethylphenyl | 3,5-dimethylphenyl |

TABLE 9

(Structure: D₁-N=N-pyridine core with CH3, CN, NH-(3-methylphenyl), and NH-(3-methylphenyl) substituents)

D₁:

- 4-nitro-1-methylnaphthalen-2-yl with CN substituent
- 4-methyl-3-nitrophenyl-C(O)-NH-phenyl
- 2-methylphenyl-SO₂-N(C₂H₅)-phenyl
- 4-methyl-3-nitrophenyl-SO₂-O-phenyl
- 2,5-dimethyl-3-cyano-4-methylthiophene (thiophene with H₃C, CN, CH₃, NC substituents)
- 2-methylphenyl-SO₂-phenyl
- 4-methyl-3-nitrophenyl with H₃CSO₂ substituent
- 3-chloro-4-methylphenyl with SO₂CH₃ substituent

TABLE 10

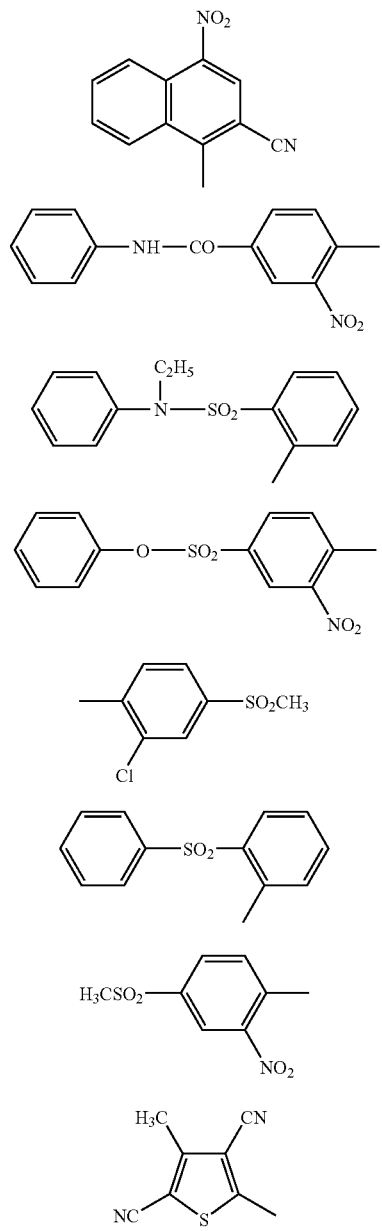

What is claimed is:

1. An azo dye of formula

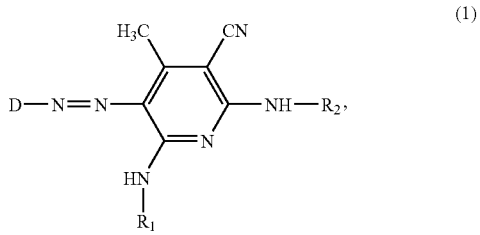

wherein

D is 2-trifluoromethyl-4-nitrophenyl, 2-cyano-4-nitrophenyl, 2-trifluoromethylphenyl, 2-trifluoromethyl-4-chlorophenyl, 2-cyano-4-nitro-6-chlorophenyl, 2-trifluoromethyl-4-nitro-6-bromophenyl, 2-phenoxysulfonylphenyl, 2-cyano-4-nitro-1-naphthyl, 2-nitro-4-phenylaminocarbonylphenyl, 2-(N-phenyl-N-ethylaminosulfonyl)phenyl, 2-nitro-4-phenoxysulfonylphenyl, 2-chloro-4-methylsulfonylphenyl, 2-phenylsulfonylphenyl, 2-nitro-4-methylsulfonylphenyl or 3,5-dicyano-4-methyl-2-thienyl and $R_1$ and $R_2$ are m-tolyl, o-tolyl, p-tolyl, 3,4-dimethylphenyl, 3,5-dimethylphenyl, 2,5-dimethylphenyl, mesityl or 4-methoxyphenyl.

2. An azo dye according to claim 1 of formula

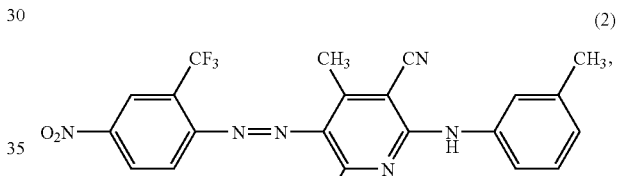

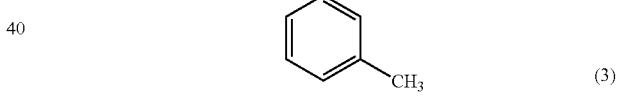

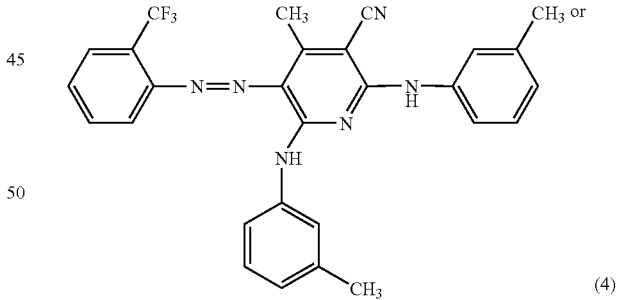

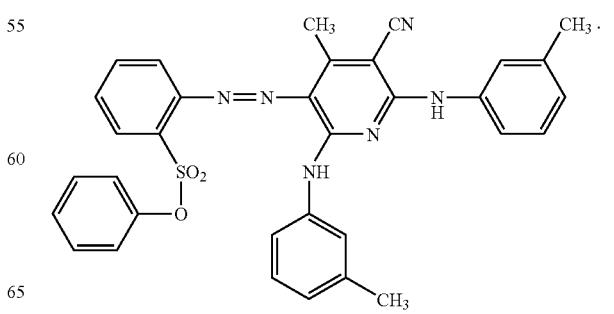

3. A process for the preparation of an azo dye of formula (1) according to claim 1, wherein a compound of formula

is diazotised in accordance with a customary procedure and then coupled to a coupling component of formula

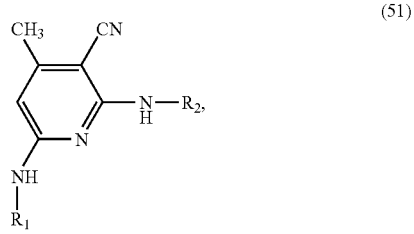

D, $R_1$ and $R_2$ being as defined in claim 1.

4. A process for the preparation of coloured plastics or polymeric colour particles, which comprises mixing together a high molecular weight organic material and a tinctorially effective amount of at least one azo dye of formula (1).

5. A process for the dyeing or printing of semi-synthetic or synthetic hydrophobic fibre materials, wherein at least one dye of formula (1) according to claim 1 is applied to the said materials or is incorporated into those materials.

6. Plastics or polymeric colour particles coloured by the process according to claim 4.

7. A semi-synthetic or synthetic hydrophobic fibre material dyed or printed by the process according to claim 5.

8. An azo dye according to claim 1 wherein $R_1$ and $R_2$ denote p-tolyl.

* * * * *